United States Patent [19]

Steinbach

[11] Patent Number: 5,093,973
[45] Date of Patent: Mar. 10, 1992

[54] TOOL TURRET FOR MACHINE TOOLS

[75] Inventor: Heinz Steinbach, Ulm, Fed. Rep. of Germany

[73] Assignee: EMAG Maschinenfabrik GmbH, Wuertt, Fed. Rep. of Germany

[21] Appl. No.: 601,218

[22] Filed: Oct. 19, 1990

[30] Foreign Application Priority Data

Oct. 24, 1989 [DE] Fed. Rep. of Germany ....... 3935399

[51] Int. Cl.$^5$ ........................... B23Q 5/22; B23B 5/00
[52] U.S. Cl. ......................................... 29/39; 82/159
[58] Field of Search ........................... 29/36, 39, 40, 41; 82/159, 139, 154, 158, 120, 121, 117, 112, 165, 110

[56]  References Cited

U.S. PATENT DOCUMENTS

| 3,010,344 | 11/1961 | Christensen | 82/117 |
| 4,304,160 | 12/1981 | Nelson | 82/158 |
| 4,413,539 | 11/1983 | Ishizuka et al. | 29/36 |
| 4,910,841 | 3/1990 | Jauch | 29/39 X |

FOREIGN PATENT DOCUMENTS

| 236603 | 9/1987 | European Pat. Off. | 82/159 |
| 3418215 | 11/1984 | Fed. Rep. of Germany | 29/39 |
| 3528437 | 2/1987 | Fed. Rep. of Germany | 82/159 |
| 3730561 | 11/1988 | Fed. Rep. of Germany | 29/39 |
| 3815690 | 11/1989 | Fed. Rep. of Germany | 82/112 |

Primary Examiner—William Briggs
Attorney, Agent, or Firm—McAulay Fisher Nissen Goldberg & Kiel

[57] ABSTRACT

The turret for machine tools has a turret disk which is rotatable via a gear unit and can be positioned in determined rotational angle positions, wherein the gear unit also serves to drive a tool drive shaft. A plurality of tool holding devices are provided on the turret disk so as to be distributed on the circumference including a base part and a tool holder which is displaceable relative to the base part vertically relative to the turret axis and adjustable. A feed gear unit is provided in the base part for the tool holder, wherein the feed gear unit can be coupled with the tool drive shaft. The tool holder and accordingly the tool carried by it can accordingly be adjusted in the radial direction. A fixedly arranged tool holder is provided with another tool at the turret disk, so that two parallel surfaces can be machined simultaneously by means of the two tools, wherein the opposite feed movements are effected by means of the carriage carrying the turret on the one hand and by means of the tool holding device on the other hand.

5 Claims, 3 Drawing Sheets

TOOL TURRET FOR MACHINE TOOLS

BACKGROUND OF THE INVENTION a) Field of the Invention

The invention is directed to a tool turret for machine tools comprising a turret disk which can be positioned in determined rotational angle positions and is rotatable, via a gear unit, by a motor, wherein the gear unit also serves to drive a tool drive shaft which can be coupled in a conventional manner with tools which are held by the turret disk so as to be drivable.

b) Background Prior Art

A tool turret of this type is known from DE-PS 37 30 561. In practice, cases often arise in which a workpiece must be machined at two parallel surfaces simultaneously, wherein the demand arises that the cutting edge of the tool not be allowed to be guided back again along the machined surface after machining so as to prevent scoring during the return movement.

In order to solve this problem it is known to provide two carriages which are coupled with one another, i.e. drivable together with one another, in the direction of the x-axis, but which are drivable independently of one another in the direction of the z-axis in order to carry out the respective movements by which the cutting edge of the tool lifts off of the tool piece, which movements run in opposite directions with reference to the two cutting edges of the tool. This requires a high cost on construction, wherein this solution also has the disadvantage that the two carriages require a relatively large amount of space and are only insufficiently accessible due to the arrangement of the main spindle for the workpiece to be clamped and machined.

It is the object of the present invention to provide a solution which is simple in terms of construction and economizes on space and which, beyond this, enables an easy accessibility to the tools and achievement of good machining quality.

A tool turret for machine tools, according to the preamble of patent claim 1, as is known from DE-PS 37 30 561, is used in order to meet this object and is constructed, according to the present invention, in such a way that at least one tool holding device is provided at the turret disk instead of the drivable tools, which tool holding device comprises a base part and a tool holder which is displaceable and adjustable relative to the base part vertically with respect to the turret axis, that a feed gear unit for the tool holder is provided in the base part and can be coupled with the tool drive shaft, and that every tool holding device is provided with a tool holder for a tool which is located radially opposite to the radially displaceable tool, the tool holder being arranged so as to be fixed at the turret disk, wherein the displaceable and the fixed tool serves to simultaneously machine opposite sides of a workpiece.

This solution, which is based on a turret for machine tools, is simple with respect to construction and, as a result of the rotatable turret disk, this arrangement also provides easy accessibility to the tools. Moreover, this construction is extremely economical with respect to space, since only one carriage is provided with a tool turret. The simultaneous machining of two opposite sides of a workpiece enabled by the solution by means of tools which are arranged at a tool holding device at the turret head by means of tool holders and which can remain in the respective selected assignment relative to one another regardless of the turret head carriage movement results in an advantageous machining quality.

A machine tool holder unit is known from DE-OS 34 18 215 in which the rotation of the spindle is used for the radial adjustment of the tools, but no suggestion for the simultaneous machining of both sides of the workpiece by two tools arranged at a tool holding device can be gathered from this DE-OS.

SUMMARY OF THE INVENTION

An advantageous construction of the invention is provided in that the feed gear unit comprises a spindle which can be coupled with the tool drive shaft and a nut which is displaceable in the base part but is guided to as to be fixed with respect to rotation and engages with a driver into a groove of the tool holder, which groove runs diagonally relative to the displacement direction of the tool holder which is guided so as to be displaceable in the base part. This gear unit construction is very simple in terms of construction and nevertheless enables an exact feed movement of the tool holder.

The steps promoting the machining quality are enumerated as follows:

In order to ensure the absence of play in the displacing drive of the tool holder, the latter is loaded by a spring in the movement direction in another construction of the invention.

In another construction of the invention, at least one piston can be arranged in the base part in order to fix the tool holder in a determined position, which piston is guided so as to be displaceable transversely relative to the movement direction of the tool holder, is acted upon hydraulically and presses against the tool holder when acted upon.

In order for the tool holder, and accordingly the cutting edge of the tool, to be accurately adjustable in their position, the tool drive shaft is connected with a rotation pickup according to an advantageous development of the invention, which rotation pickup sends corresponding pulses during a rotational movement, which pulses can be used for adjusting a determined position or for relocating a predetermined position of the cutting edge of the tool.

BRIEF DESCRIPTION OF THE DRAWINGS

The invention is explained in more detail in the following by means of an embodiment example shown in the drawing.

DESCRIPTION OF THE PREFERRED EMBODIMENTS

Figure 1:
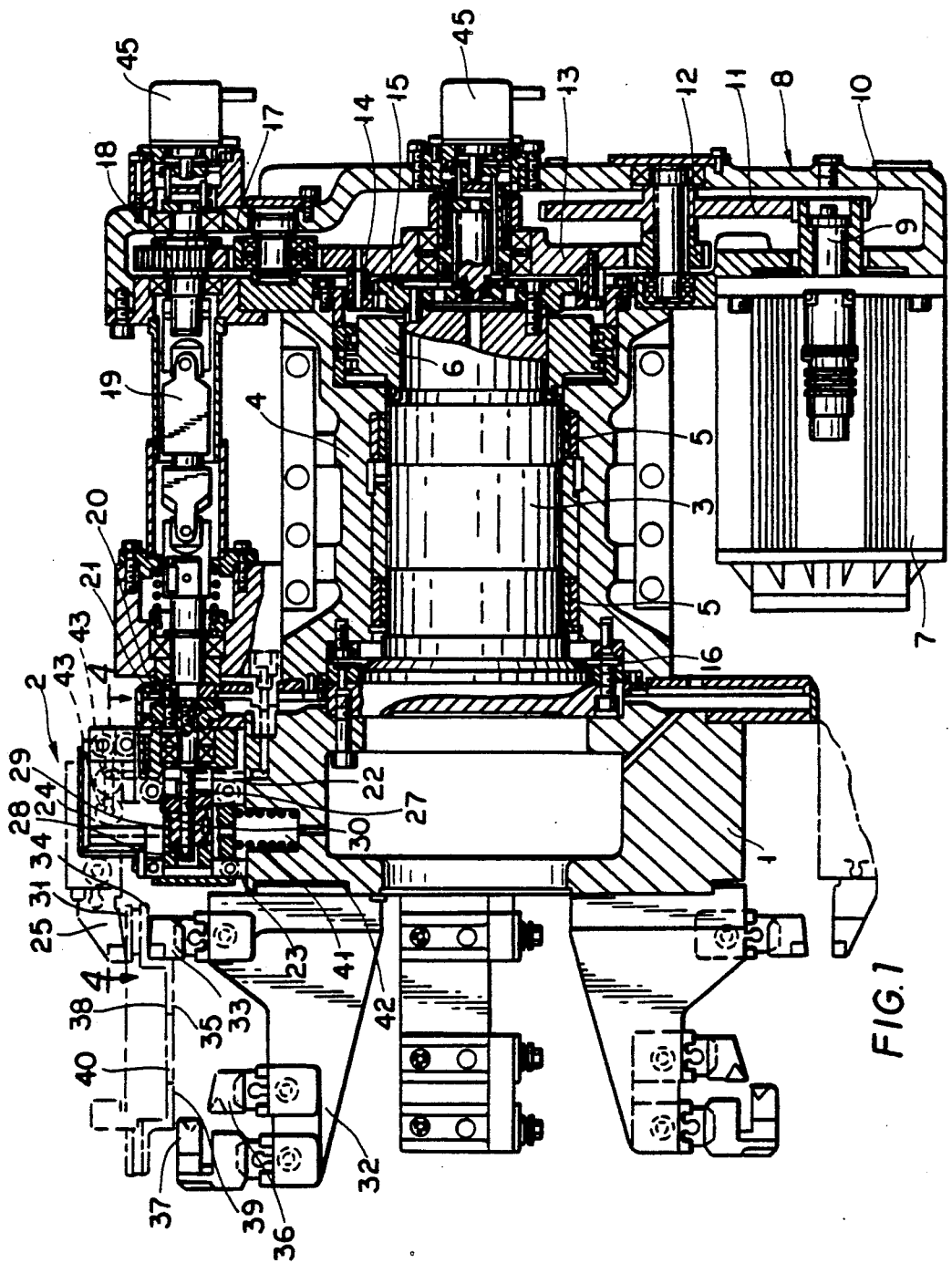
FIG. 1 shows a section through a turret for machine tools with a tool holding device.
Figure 2:
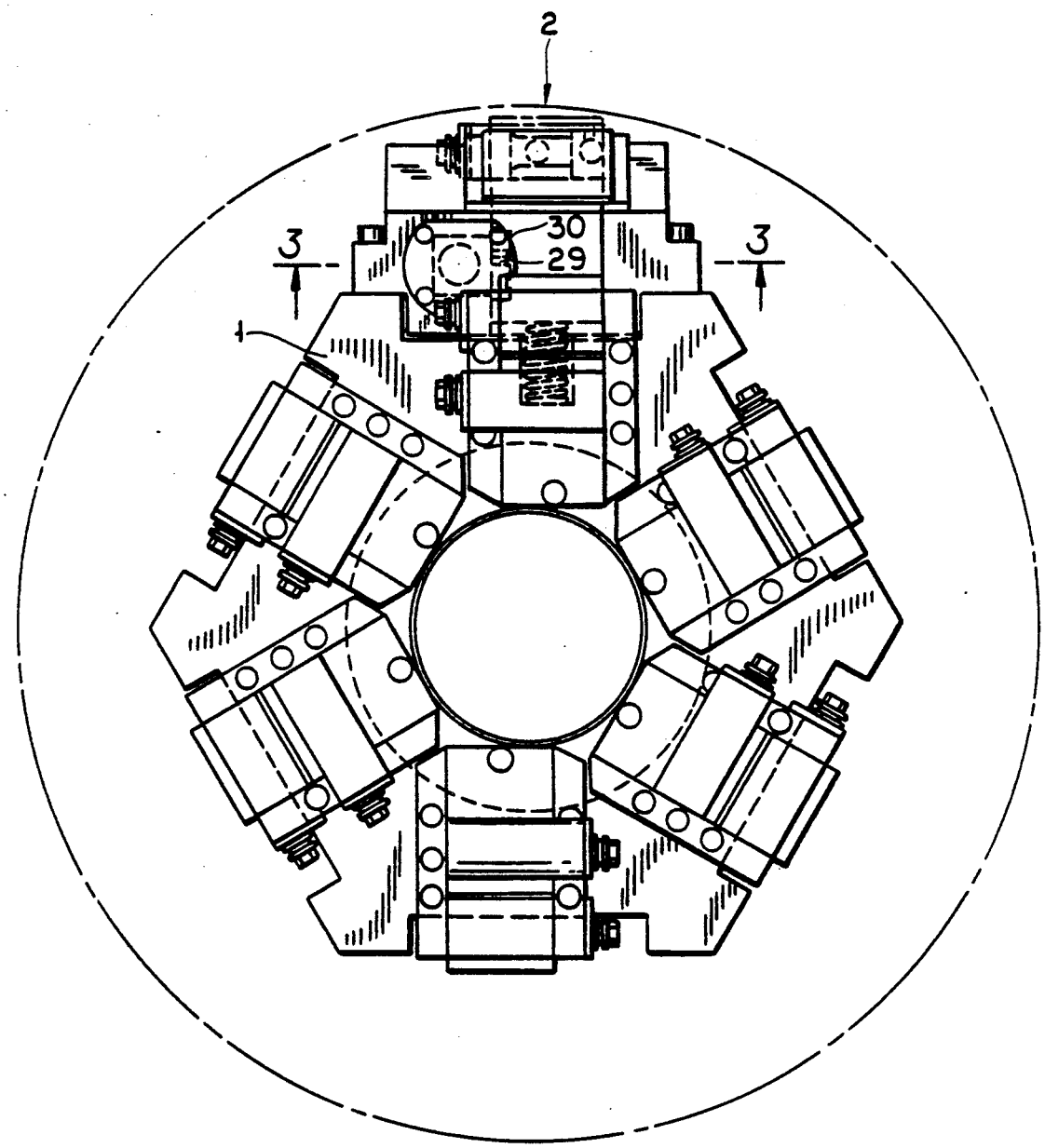
FIG. 2 shows a front view of the turret.
Figure 3:
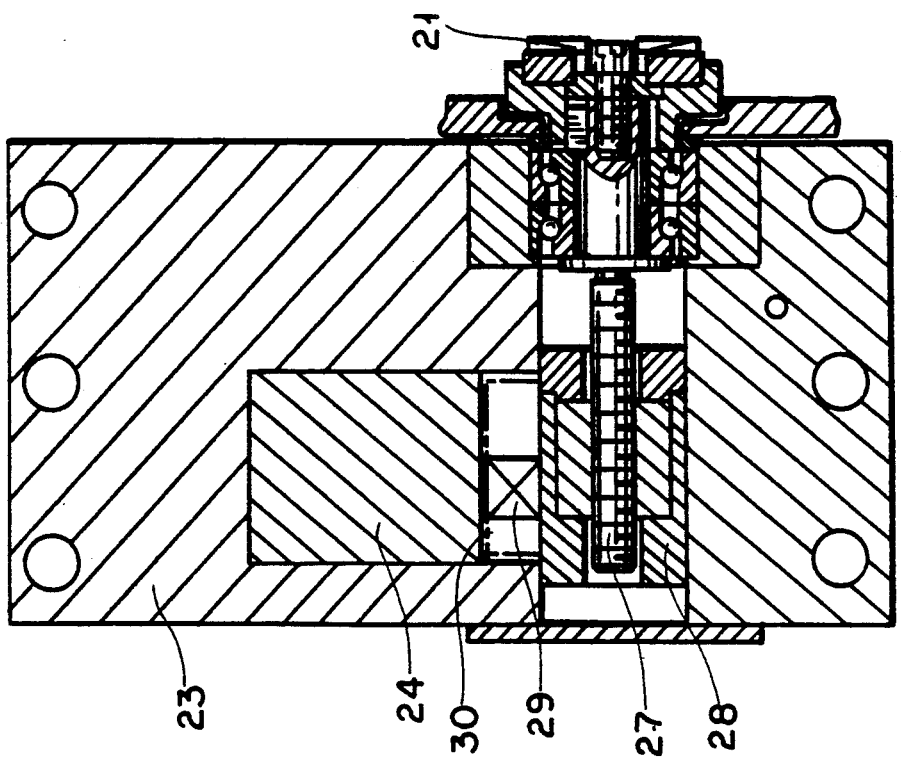
FIG. 3 shows a section according to line III—III in FIG. 2.

As can be seen from FIGS. 1 and 2, tool holding devices, designated in their entirety by 2, are arranged at a turret disk 1 at a plurality of positions which are uniformly distributed on the circumference.

The turret disk 1 is fastened at a turret shaft 3 which is supported in a turret housing 4 by means of bearings 5 so as to be rotatable and axially displaceable. A double-action hydraulic piston 6 is provided for axial displacement.

A motor 7, which effects the rotational movement of the turret shaft 3 via a flanged on gear unit, designated in its entirety by 8, serves to drive the turret shaft, i.e. to rotate it with respect to angle. A pinion 10 is arranged on the motor shaft 9 for this purpose, the pinion 10 meshes with a toothed wheel 11 which is connected with another toothed wheel 12 so as to be fixed with respect to rotation relative to it, the toothed wheel 12 engaging with a toothed wheel 13 which is arranged coaxially relative to the turret shaft 3. The coaxial toothed wheel 13 is fixedly connected with a toothed wheel 14 comprising inner toothing; the toothed wheel 14 can engage with a toothed wheel 15 which is fixedly arranged on the turret shaft 3, specifically as a function of the axial displacement position of the turret shaft 3. In the position shown in FIG. 1, the turret shaft is secured relative to the turret housing 4 by means of a Hirth coupling 16. If the turret shaft 3 is displaced in its other end position by means of the piston 6, the Hirth coupling 16 is disengaged and the toothed wheels 14 and 15 engage, constituting a switchable coupling by means of which the motor 7 can be connected with the turret shaft 3 via the gear unit.

The coaxial toothed wheel 13 is connected, via another toothed wheel 17, with a drive pinion 18 which is arranged on a tool drive shaft 19 which can be coupled with the tool holding device 2 via a coupling 20 which is constructed as a spur gear or Hirth coupling.

The coupling part 20 of the tool drive shaft 19 can be coupled with a corresponding coupling part 21 of a feed gear unit 22 which is provided inside a base part 23 of the tool holding device 2.

The tool holding device 2 comprises the base part 23, which is fastened on the turret disk 1, as well as a tool holder 24 which is guided so as to be displaceable relative to the base part 23. In the shown embodiment example the tool holder 24 carries a turning tool 25 for machining a planar surface.

The feed gear unit 22 comprises a spindle 27 and a nut 28 which is guided in the base part 23 so as to be fixed with respect to rotation, but displaceable. The spindle 27 is connected with the aforementioned coupling part 21 and can therefore be connected with the tool drive shaft 19.

The nut 28 is connected with a driver 29 which engages in a diagonally extending groove 30 of the tool holder 24. The spindle 27 is rotated by means of coupling the spindle 27, via the coupling parts 21 and 20, to the tool drive shaft 19 during rotation of same, which spindle 27 effects a displacement of the nut 28 which displaces the tool holder 24 in its guide in the base part 23 in the radial direction via the driver 29, i.e. vertically relative to the turret axis, and accordingly displaces a feed of the tool 25 with respect to a planar surface 31 to be machined.

Another tool holder 32 is provided at the turret disk 1, which tool holder 32 carries another turning tool 33 serving to machine a surface 34 which is parallel to the surface 31. The shown embodiment example concerns a brake disk 35 in which the braking surfaces 31 and 34 are to be machined without being scored during the return movement. The brake disk is clamped in a spindle, not shown, wherein the machining is effected simultaneously from the outside toward the inside by means of the two turning tools 25 and 33. The machining has just ended in the position shown in the drawing. The tool holder 24 is then displaced outward by means of the tool drive shaft 19 and the feed gear unit 22, so that the turning tool 25 comes free from the machining surface 31. The carriage which carries the turret and is not shown in the drawing is then moved in the opposite direction, so that the turning tool 33 comes free from the surface 34 of the brake disk 35. In this position, the turret can then be moved away in the radial direction with reference to the brake disk 33 by means of the carriage.

The tool holder 32 carries two additional tools 36 and 37 which serve for the simultaneous machining of the clamping surfaces 38 and 39 of the brake disk 35; the tool 37 can be inserted through the opening 40 of the brake disk 35 for this purpose.

In order to ensure the absence of play in the displacement of the tool holder 24, the latter is supported by means of a spring 41 whose opposite end is received in a bore hole 42 of the turret disk 1.

Figure 4:
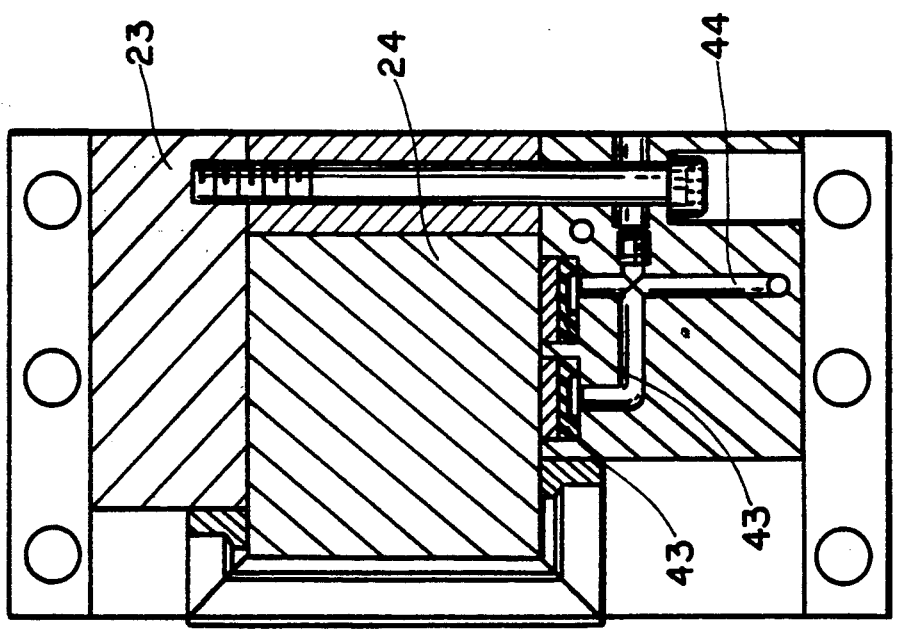
FIG. 4 shows a section according to line IV—IV in FIG. 1.

As can be seen from FIGS. 1 and 4, two hydraulically actuable pistons 43 are provided in the base part 23, which pistons 43 can be acted upon simultaneously via a feed line 44 and clamp the tool holder 24 in this state when machining is taking place.

The tool drive shaft 19 is provided with a rotation pickup 45 at the end opposite the coupling part 20, which rotation pickup 45 sends corresponding pulses during the rotation of the tool drive shaft 19 which enables the adjustment of the accurate position of the cutting edge of the tool.

While the foregoing description and drawings represent the preferred embodiments of the present invention, it will be obvious to those skilled in the art that various changes and modifications may be made therein without departing from the true spirit and scope of the present invention.

What is claimed is:

1. In a tool turret for machine tools having a turret disk which can be positioned in determined rotational angle positions and is rotatable, via a gear unit, by a motor, wherein the gear unit also serves to drive a tool drive shaft which can be coupled in a conventional manner with drivable tools which are held by the turret disk, the improvement comprising: at least one tool holding device being provided at the turret disk instead of the drivable tools, which tool holding device includes a base part and a first tool holder which is displaceable and adjustable relative to the base part vertically with respect to the turret axis, a feed gear unit for the first tool holder being provided in the base part and which can be coupled with the tool drive shaft, and wherein every tool holding device is provided with a second tool holder for a fixed tool which is located radially opposite to the radially displaceable tool on the first tool holder, the second tool holder being arranged so as to be fixed at the turret disk, and wherein the displaceable tool and the fixed tool serve to simultaneously machine opposite sides of a workpiece.

2. A tool turret according to claim 1, wherein the feed fear unit comprises a spindle which can be coupled with the tool drive shaft and a nut which is displaceable in the base part, but is guided so as to be fixed with respect to rotation and engages with a driver into a groove of the first tool holder, which groove extends diagonally relative to the displacement direction of the first tool holder which is guided so as to be displaceable in the base part.

3. A tool turret according to claim 1 or 2, wherein the first tool holder is loaded in the movement direction by means of a spring.

4. A tool turret according to claim 1, wherein, at least one piston is arranged in the base part, which piston is guided so as to be displaceable transversely relative to the movement direction of the first tool holder, is acted upon hydraulically and presses against the first tool holder when acted upon.

5. A tool turret according to claim 1, wherein the tool drive shaft is connected with a rotation pickup.

* * * * *